(12) United States Patent
Sweet et al.

(10) Patent No.: US 8,675,215 B2
(45) Date of Patent: Mar. 18, 2014

(54) USING REGIONS OF INTEREST TO SCALE PRINT DATA FOR PRINT JOBS

(75) Inventors: Michael R. Sweet, Morgan Hill, CA (US); David Gelphman, Aptos, CA (US); Richard Blanchard, Jr., Sonoma, CA (US); Todd W. Ritland, San Francisco, CA (US); Howard A. Miller, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 13/363,197

(22) Filed: Jan. 31, 2012

(65) Prior Publication Data

US 2013/0194621 A1  Aug. 1, 2013

(51) Int. Cl.
*G06F 15/00* (2006.01)
*G06F 3/12* (2006.01)
*G06K 1/00* (2006.01)

(52) U.S. Cl.
CPC .............. *G06F 3/125* (2013.01); *G06F 3/1206* (2013.01); *G06K 2215/0097* (2013.01)
USPC .......................................... 358/1.13; 358/1.9

(58) Field of Classification Search
CPC .................. G06F 3/125; G06F 3/1206; G06K 2215/0097
See application file for complete search history.

(56) References Cited

U.S. PATENT DOCUMENTS

| | | | |
|---|---|---|---|
| 5,287,194 A | 2/1994 | Lobiondo | |
| 5,768,483 A | 6/1998 | Maniwa | |
| 6,268,927 B1 | 7/2001 | Lo | |
| 6,549,654 B1 | 4/2003 | Kumada | |
| 2002/0078149 A1 | 6/2002 | Chang | |
| 2002/0138564 A1 | 9/2002 | Treptow | |
| 2003/0063309 A1 | 4/2003 | Parry | |
| 2004/0160623 A1 | 8/2004 | Strittmatter | |
| 2004/0239986 A1 | 12/2004 | Wise | |
| 2005/0046886 A1 | 3/2005 | Ferlitsch | |
| 2005/0050013 A1 | 3/2005 | Ferlitsch | |
| 2007/0127063 A1 | 6/2007 | Fertlitsch | |
| 2007/0177192 A1 | 8/2007 | Wang | |
| 2007/0182993 A1 | 8/2007 | Yamada | |

(Continued)

FOREIGN PATENT DOCUMENTS

| | | |
|---|---|---|
| CN | 1217503 A | 5/1999 |
| CN | 1525305 A | 9/2004 |

(Continued)

OTHER PUBLICATIONS

'Bonjour Printing Specification', Apple Computer, Inc., Apr. 12, 2005, 24 pages.

(Continued)

*Primary Examiner* — Douglas Tran
(74) *Attorney, Agent, or Firm* — Wong, Cabello, Lutsch, Rutherford & Brucculeri LLP

(57) ABSTRACT

The disclosed embodiments provide a system that performs a print job. During operation, the system obtains one or more regions of interest associated with print data for the print job, wherein the print data is not formatted for a media size for the print job. Next, the system scales the print data based on a region of interest from the one or more regions of interest and the media size. Finally, the system sends the print job to a printer, wherein the print job is executed using the printer.

21 Claims, 5 Drawing Sheets

(56) References Cited

U.S. PATENT DOCUMENTS

| | | | |
|---|---|---|---|
| 2008/0112013 A1 | 5/2008 | Ferlitsch | |
| 2008/0180699 A1 | 7/2008 | Selvaraj | |
| 2009/0059272 A1 | 3/2009 | Matsushita | |
| 2010/0178067 A1* | 7/2010 | Azami et al. | 399/16 |
| 2011/0194123 A1 | 8/2011 | Sweet | |
| 2011/0194124 A1 | 8/2011 | Sweet | |
| 2011/0194140 A1 | 8/2011 | Sweet | |
| 2011/0194141 A1 | 8/2011 | Sweet | |
| 2011/0235064 A1* | 9/2011 | Arai | 358/1.2 |

FOREIGN PATENT DOCUMENTS

| | | |
|---|---|---|
| CN | 1537298 A | 10/2004 |
| EP | 1450515 A2 | 8/2004 |
| EP | 1818805 A2 | 8/2007 |
| EP | 1953642 A2 | 8/2008 |
| EP | 1973031 A1 | 9/2008 |
| JP | 11053142 A | 2/1999 |
| WO | 2011100148 A1 | 8/2011 |

OTHER PUBLICATIONS

Cheshire, S. et al., 'DNS-Based Service Discovery', The Internet Society, Feb. 14, 2004, 32 pages.

Cheshire, S. et al., 'Dynamic Configuration of IPv4 Link-Local Addresses', The Internet Society, May 2005, 33 pages.

First Office Action received in corresponding CN Application No. 201110034596.3 dated Apr. 2, 2013 with translation.

First Office Action received in corresponding CN Application No. 201110034714.0, dated May 24, 2013.

Hastings, T. et al., 'Internet Printing Protocol/1.0: Implementer's Guide', The Internet Society, Jul. 1999, 65 pages.

International Search Report and Written Opinion for PCT Application No. PCT/US2011/023474, Dated Mar. 25, 2011 7 pages.

International Search Report and Written Opinion received in corresponding PCT Application No. PCT/US2013/024006 dated Apr. 25, 2013.

International Search Report and Written Opinion received in corresponding PCT Application No. PCT/US2013/024031 dated Apr. 17, 2013.

Search Report and Written Opinion received in corresponding PCT Application No. PCT/US2011/023475, dated Mar. 25, 2011.

Wright, F.D., 'Design Goals for an Internet Protocol', The Internet Society, Apr. 1999, 86 pages.

Zilles, Stephen, 'Rationale for the Structure of the Model and Protocol for the Internet Printing Protocol', The Internet Society, Apr. 1999, 10 pages.

\* cited by examiner

USING REGIONS OF INTEREST TO SCALE PRINT DATA FOR PRINT JOBS

RELATED APPLICATION

The subject matter of this application is related to the subject matter in a co-pending non-provisional application by inventors Michael R. Sweet and Howard Miller and filed 14 Sep. 2010, entitled "Framework that Supports Driverless Printing," having Ser. No. 12/882,116.

BACKGROUND

1. Field

The disclosed embodiments relate to printers for computer systems. More specifically, the disclosed embodiments relate to techniques for scaling print data for print jobs using regions of interest associated with the print data.

2. Related Art

Printing may facilitate a variety of personal and/or business activities. For example, documents may be printed within a business for design, marketing, accounting, review, record-keeping, planning, and/or notification purposes. Similarly, a user may print pictures and/or greeting cards for display and/or sharing with friends, family, and/or acquaintances.

However, different types of print settings and/or printer capabilities may be required to produce optimal print output for various types of documents. For example, a word-processing document may be printed on a laser printer in black-and-white to enhance the readability and/or sharpness of text in the word-processing document. On the other hand, the resolution and/or color gamut of a color photo may be emphasized by printing the color photo on glossy paper using a dye-sublimation printer.

Hence, what is needed is a mechanism for using print settings and/or printer capabilities to enhance print output for various types of digital media.

SUMMARY

The disclosed embodiments provide a system that performs a print job. During operation, the system obtains one or more regions of interest associated with print data for the print job, wherein the print data is not formatted for a media size for the print job. Next, the system scales the print data based on a region of interest from the one or more regions of interest and the media size. Finally, the system sends the print job to a printer, wherein the print job is executed using the printer.

In some embodiments, the system also rotates the print data based on the region of interest and the media size. For example, the system may rotate and/or scale the print data to fit the region of interest to the media size.

In some embodiments, the one or more regions of interest include at least one of an art box, a crop box, and a media box. In addition, the print data may be scaled based on an order of precedence associated with the one or more regions of interest. For example, scaling of the print data may be performed by attempting to scale the print data using the art box. If the art box is not specified, the scaling may proceed with an attempt to scale the print data using the crop box. Finally, if the crop box is not specified, the print data may be scaled using the media box.

In some embodiments, the region of interest is obtained from metadata associated with the print data. For example, the region of interest may be specified as a PDF page box from a PDF document. Alternatively, the region of interest may be provided using Document Structuring Comments (DSC) in a PostScript (PostScript™ is a registered trademark of Adobe Inc.) document and/or within a comment field of a Portable Network Graphics (PNG) and/or Joint Photographic Experts Group (JPEG) image. Finally, the region of interest may be included in a metadata extension of a Scalable Vector Graphics (SVG) and/or Open Extensible Markup Language (XML) Paper Specification (OpenXPS) document.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
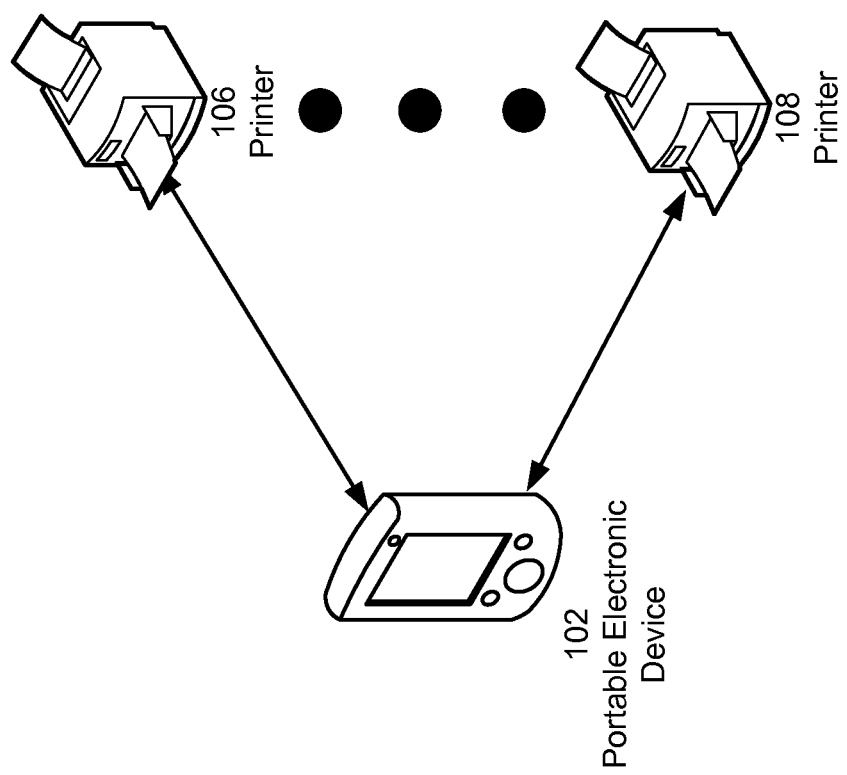
FIG. 1 shows a printing system in accordance with the disclosed embodiments.

The disclosed embodiments relate to a method and system for performing a print job. As shown in FIG. 1, a portable electronic device 102 includes functionality to communicate with a set of printers 106-108. For example, portable electronic device 102 may implement a print server that configures print jobs from portable electronic device 102, sends the print jobs to printers 106-108, and receives notifications associated with the print jobs from printers 106-108. Alternatively, portable electronic device 102 may communicate with printers 106-108 through an external print server.

Portable electronic device 102 may correspond to a mobile phone, laptop computer, tablet computer, personal digital assistant (PDA), portable media player, and/or other type of battery-powered electronic device. Printers 106-108 may correspond to network printers that are capable of wired and/or wireless communications. Alternatively, one or more printers may connect to portable electronic device 102 and/or another print server as local peripherals using one or more printer cables and/or one or more ports (e.g., parallel ports, serial ports, Universal Serial Bus (USB) ports).

Portable electronic device 102 may interact with printers 106-108 through one or more networks. Such networks may include any type of communication channel capable of coupling together network nodes. For example, the network(s) may include a wireless network connection, such as a Bluetooth (Bluetooth™ is a registered trademark of Bluetooth SIG, Inc.) network connection; a cellular networking connection (e.g., a 3G/4G network or an Edge network); a networking connection based on the standards described in Institute for Electrical and Electronic Engineers (IEEE) 802.11; a wireless personal-area networking (PAN) connection, such as a network connection based on the standards described in IEEE 802.15; or any peer-to-peer (wireless or wired) networking technology.

In one or more embodiments, the printing system of FIG. 1 includes functionality to perform "driverless printing," in which a user of portable electronic device 102 may print to a nearby printer (e.g., printers 106-108) without installing and/or updating associated printer driver software. For example, portable electronic device 102 may discover (e.g., detect) a nearby printer (e.g., printers 106-108) using a discovery protocol such as Bonjour (Bonjour™ is a registered trademark of Apple Inc.). To enable detection of the printer by portable electronic device 102, the printer may advertise a driverless-printing service on the discovery protocol. For example, the printer may advertise the driverless-printing service on Bonjour by publishing a specific service type and subtype.

Figure 2:
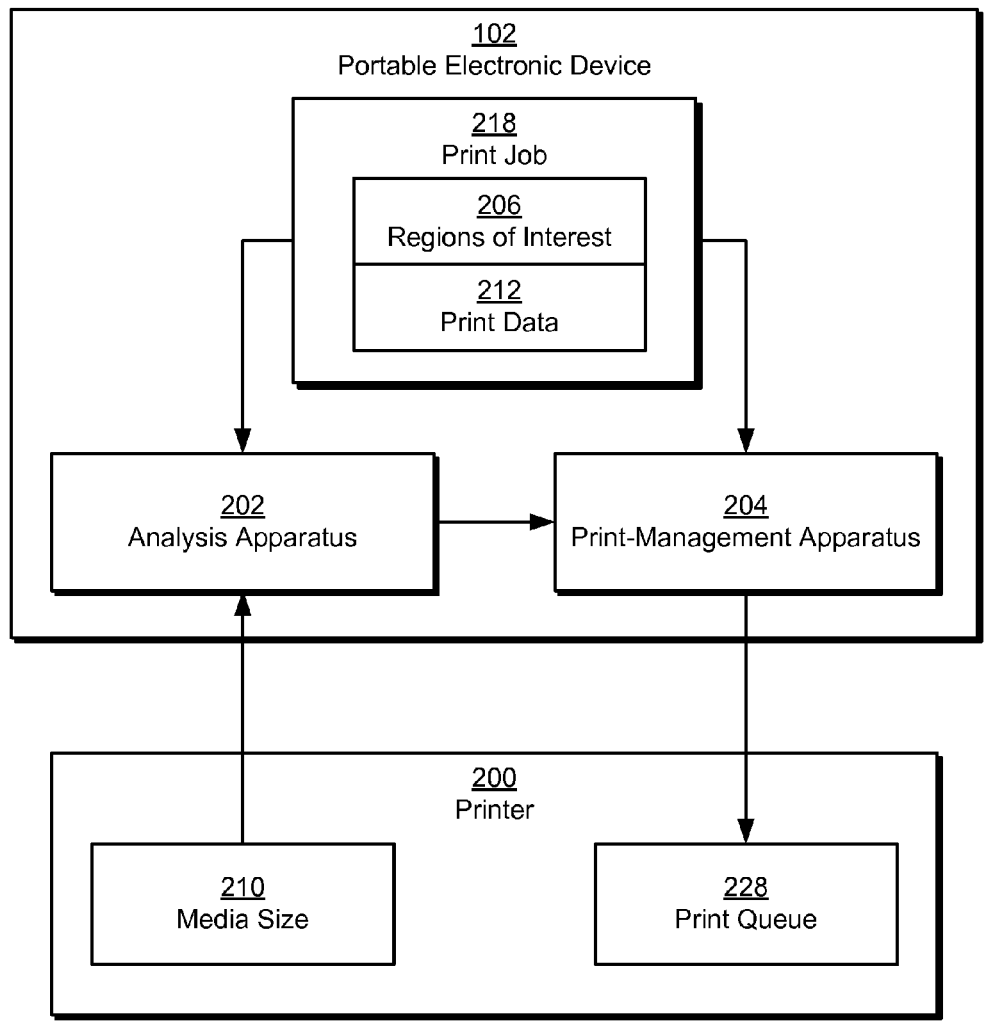
FIG. 2 shows a system for performing a print job in accordance with the disclosed embodiments.

As shown in FIG. 2, once a printer 200 is selected for performing a print job 218 (e.g., by a user of portable electronic device 102), a print-management apparatus 204 on portable electronic device 102 may obtain print job 218 from an application on portable electronic device 102 and transmit print job 218 to printer 200 over a network connection with printer 200. Printer 200 may then place print job 218 into a print queue 228 and execute print job 218 after print jobs preceding print job 218 in print queue 228 have been completed and/or cancelled. Driverless printing for portable electronic devices is discussed in further detail in a co-pending non-provisional application by inventors Michael R. Sweet and Howard Miller and filed 14 Sep. 2010, entitled "Framework that Supports Driverless Printing," having Ser. No. 12/882,116, which is incorporated herein by reference.

In addition, a user requesting print job 218 may specify one or more settings for performing print job 218. For example, the user may select print data 212 (e.g., a file) to be printed and one or more job options associated with printing print data 212. The job options may include a number of copies, a number of printing sides (e.g., single- or double-sided), collation, stapling, hole punching, an ink set (e.g., black-and-white, color), a toner, a dye, a ribbon, a media size 210 (e.g., A4, letter), a border size (e.g., bordered, borderless), a media type (e.g., glossy, matte, bond, colored), a paper tray, an output bin, a resolution and/or print quality (e.g., low, medium, high), a page orientation, and/or a printing range (e.g., page range, selection).

However, print data 212 may not be formatted for the job options specified by the user. More specifically, print data 212 may not be formatted for the specified media size 210 for print job 218. For example, print job 218 may include a Portable Document Format (PDF) file that is formatted for A3 paper as print data 212 and letter paper for media size 210.

To facilitate reproduction of print data 212 on media of media size 210, print data 212 may be scaled and/or rotated to fit print data 212 to media size 210. However, scaling of print data 212 to fit media size 210 may be performed in an ad hoc, implementation-dependent manner by printer 200 and/or portable electronic device 102. For example, a first printer may print an image with a 3:2 aspect ratio at the top of a sheet of letter paper, with the remaining bottom portion of the sheet left blank. On the other hand, a second printer may rotate the image 90 degrees and scale the image up prior to printing on letter paper, such that blank space on the sheet borders the sides of the image and is smaller in area than the blank space produced by the first printer. Moreover, such differences in scaling behavior may further produce variable print output, thus negatively impacting the use of portable electronic device 102 and/or printer 200 in performing print jobs.

In one or more embodiments, the system of FIG. 2 includes functionality to standardize the scaling of print data (e.g., print data 212) for print jobs (e.g., print job 218) on portable electronic device 102. First, an analysis apparatus 202 on portable electronic device 102 may obtain one or more regions of interest 206 associated with print data 212. Regions of interest 206 may correspond to bounding boxes that identify and/or define content within print data 212. For example, regions of interest 206 may include an art box that identifies important content in print data 212 and/or a crop box that contains content to be printed, including an overbleed area. Regions of interest 206 may also include a media box that specifies the width and height of a page for which print data 212 is formatted and/or a trim box that defines the intended dimensions of the final page.

In addition, regions of interest 206 may be obtained from metadata associated with print data 212. For example, regions of interest 206 may be obtained as user-specified PDF page boxes from a PDF document. Alternatively, regions of interest 206 may be specified using Document Structuring Comments (DSC) in a PostScript (PostScript™ is a registered trademark of Adobe Inc.) document and/or within comment fields of a Portable Network Graphics (PNG) and/or Joint Photographic Experts Group (JPEG) image. Finally, regions of interest 206 may be included in metadata extensions of a Scalable Vector Graphics (SVG) and/or Open Extensible Markup Language (XML) Paper Specification (OpenXPS) document.

Next, analysis apparatus 202 may scale print data 212 based on a region of interest from the one or more regions of interest 206 and media size 210. For example, analysis apparatus 202 may scale content (e.g., a subset of print data 212) within the region of interest to provide the best reproduction of the content on media of media size 210.

In one or more embodiments, analysis apparatus 202 scales print data 212 based on an order of precedence associated with regions of interest 206. For example, analysis apparatus 202 may initially attempt to scale print data 212 using an art box associated with print data 212. If the art box is not specified, analysis apparatus 202 may attempt to scale print data 212 using a crop box for print data 212. If the crop box is not specified, analysis apparatus 202 may scale print data 212 using a media box for print data 212. Analysis apparatus 202 may also rotate print data 212 based on the selected region of interest and media size 210. For example, analysis apparatus 202 may rotate print data 212 in landscape orientation by 90 degrees to maximize the reproduction of print data 212 on media with a portrait orientation.

Finally, a print-management apparatus 204 in portable electronic device 102 may send print job 218 to printer 200 for execution of print job 218 by printer 200. Because the system of FIG. 2 follows an order of precedence for scaling print data (e.g., print data 212) for print jobs (e.g., print job 218), print output associated with the print data may be standardized across different printers and/or portable electronic devices. Furthermore, the scaling and/or rotating of the print data based on regions of interest containing important content may facilitate the reproduction of the content on media regardless of the media size associated with the media.

Those skilled in the art will appreciate that the system of FIG. 2 may be implemented in a variety of ways. For example, analysis apparatus 202 and print-management apparatus 204 may be provided by the same software and/or hardware component, or analysis apparatus 202 and print-management apparatus 204 may execute independently from one another. Similarly, analysis apparatus 202 and/or print-management apparatus 204 may be implemented by printer 200 and/or a print server acting as an intermediary between portable electronic device 102 and printer 200, in addition to or in lieu of corresponding components on portable electronic device 102.

Figure 3:
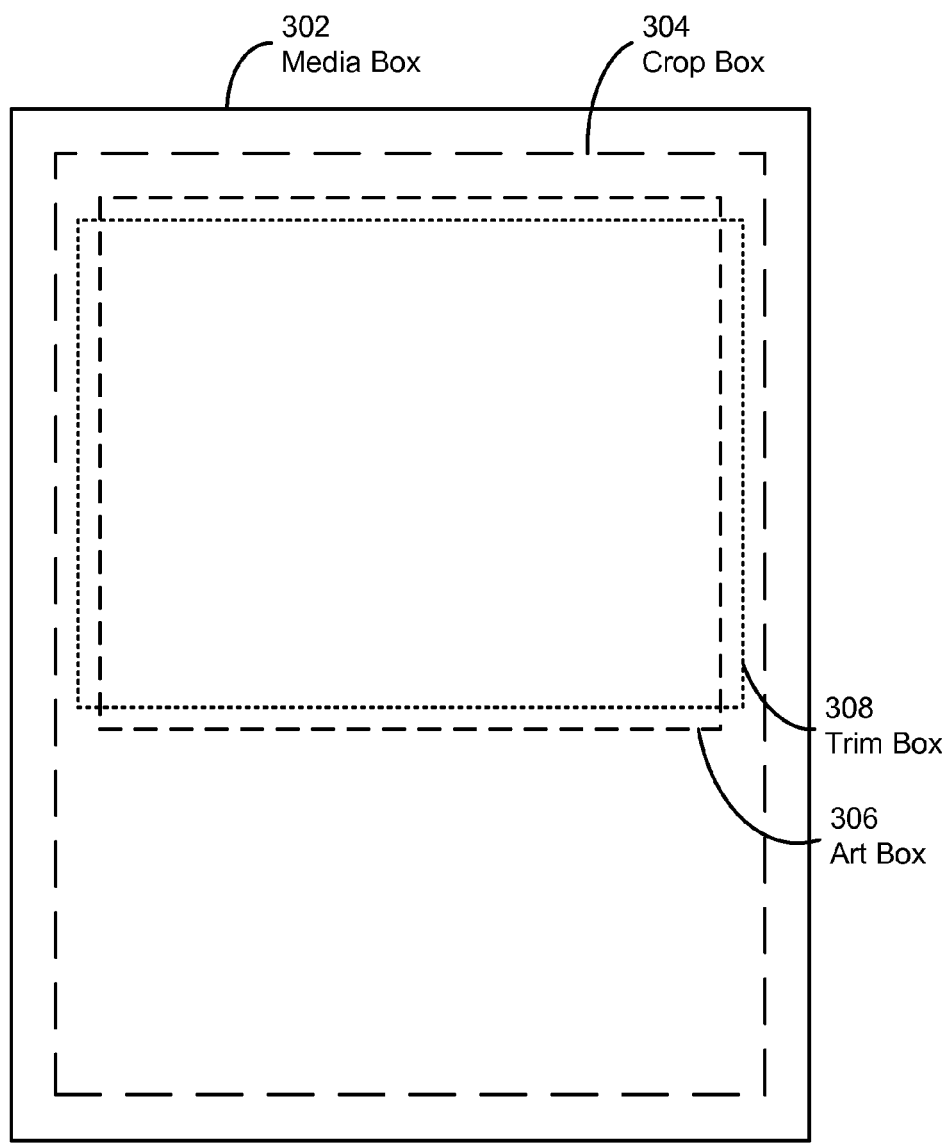
FIG. 3 shows an exemplary set of regions of interest for a print job in accordance with the disclosed embodiments.

FIG. 3 shows an exemplary set of regions of interest for a print job in accordance with the disclosed embodiments. As shown in FIG. 3, the regions of interest may include a media box 302, a crop box 304, an art box 306, and a trim box 308. The regions of interest may be provided using page boxes, metadata extensions, comments, and/or other types of metadata associated with print data for the print job.

Media box 302 may specify the dimensions of a page for which the print data is formatted. For example, media box 302 may have dimensions that match those of A4 and/or letter media. In addition, media box 302 may be the largest page box and/or region of interest specified for the print job. Crop box 304 and art box 306 may define the content to be printed, with the area outside art box 306 but within crop box 304 used as an overbleed area for the print job. In other words, art box 306 may indicate the portion of the print data that is important for printing, and crop box 304 may include additional content to mitigate registration errors within art box 306. Finally, trim box 308 may define the dimensions of the finished page. For example, content within trim box 308 may be cut out and used as final print output after the print job is completed.

As mentioned above, the print data may be scaled and/or rotated based on media box 302, crop box 304, art box 306, and/or trim box 308. For example, the print data may not be formatted for a media size for the print job. As a result, a region of interest corresponding to media box 302, crop box 304, art box 306, and/or trim box 308 may be rotated and/or scaled to provide the best reproduction of important content within the print data on media of the media size.

Moreover, the region of interest may be selected based on an order of precedence associated with the regions of interest. For example, the order of precedence may begin with art box 306, proceed to crop box 304, and end with media box 302. If art box 306 is defined, the print data is scaled and/or rotated using art box 306. If art box 306 is not defined but crop box 304 is defined, the print data is scaled and/or rotated using crop box 304. Finally, if neither art box 306 nor crop box 304 is defined, the print data is scaled and/or rotated using media box 302. Because trim box 308 is generally used after the print data is printed, trim box 308 may not be used in scaling and/or rotating of the print data.

Figure 4:
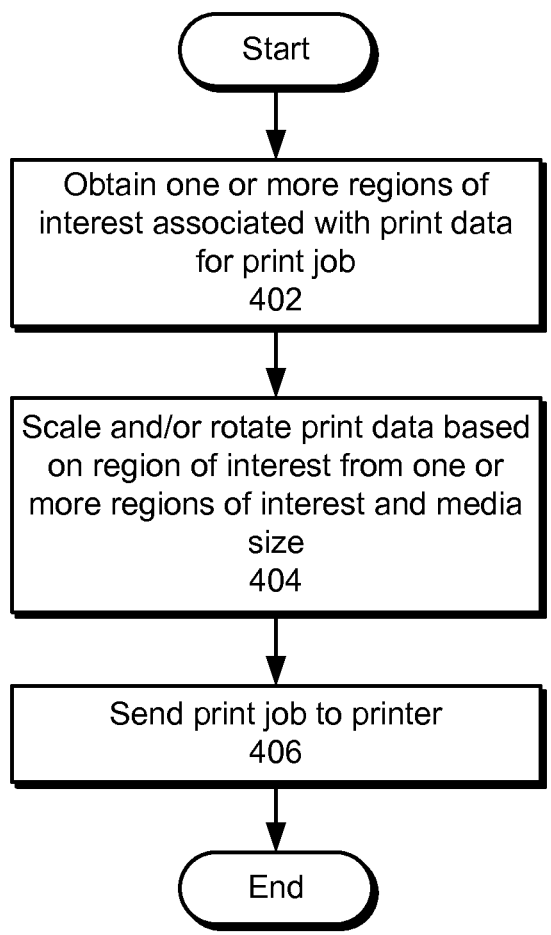
FIG. 4 shows a flowchart illustrating the process of performing a print job in accordance with the disclosed embodiments.

FIG. 4 shows a flowchart illustrating the process of performing a print job in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, one or more regions of interest associated with print data for the print job are obtained (operation 402). The print data may correspond to an image, document, and/or other type of file that is not formatted for a media size for the print job. For example, the print data may be formatted for an A4 media size, while a letter media size may be specified for the print job. The region(s) of interest may correspond to bounding boxes that identify and/or define content within the print data.

To facilitate reproduction of the print data on media of the media size, the print data may be scaled and/or rotated based on a region of interest from the one or more regions of interest and the media size (operation 404). The region of interest may be selected according to an order of precedence associated with the one or more regions of interest. For example, the region(s) of interest may include an art box, a crop box, and/or a media box. First, an attempt to scale the print data using the art box may be made. If the art box is not specified, an attempt to scale the print data using the crop box may be made. If the crop box is not specified, the print data may be scaled using the media box. Similarly, the print data may be rotated to better fit the region of interest to the media.

Finally, the print job is sent to the printer (operation 406) for execution of the print job. For example, the print job may be placed in a print queue for the printer to be subsequently sent to the printer once the printer is ready to start the print job.

Figure 5:
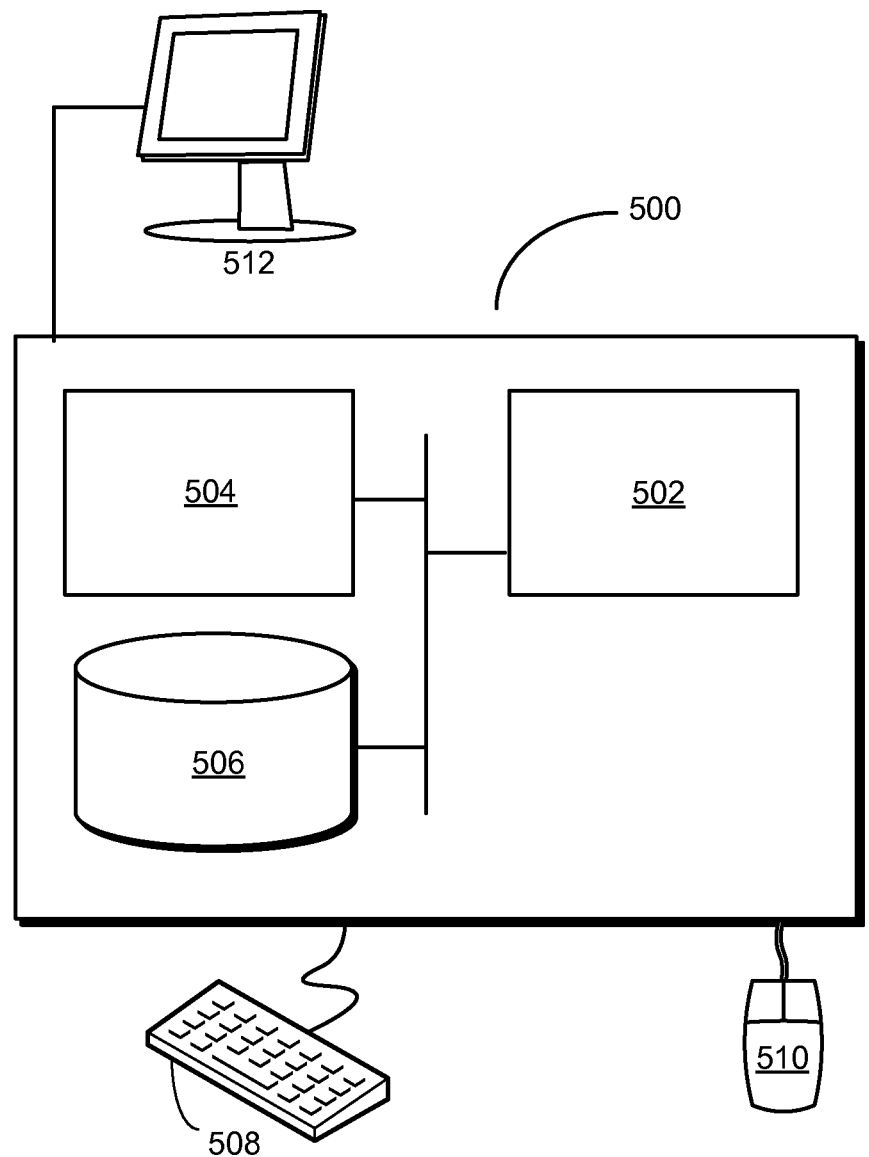
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for performing a print job. The system may include an analysis apparatus that obtains one or more regions of interest associated with print data for the print job. If the print data is not formatted for a media size for the print job, the analysis apparatus may also scale and/or rotate the print data based on a region of interest from the one or more regions of interest and the media size. Such scaling and/or rotation may be performed to fit the region of interest to the media size. The system may also include a print-management apparatus that sends the print job to a printer for execution of the print job by the printer.

In addition, one or more components of computer system 500 may be remotely located and connected to the other components over a network. Portions of the present embodiments (e.g., analysis apparatus, print-management apparatus, portable electronic device, printer, etc.) may also be located on different nodes of a distributed system that implements the embodiments. For example, the present embodiments may be implemented using a number of portable electronic devices and a number of printers configured to perform printing for the portable electronic devices using a driverless-printing service.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for performing a print job, comprising:
    obtaining one or more regions of interest associated with print data for a print job, wherein each of the one or more regions of interest comprises a bounding box that identifies content within the print data, wherein the print data is not properly formatted for a media size for the print job, and wherein the media size refers to a physical size of a media onto which the print data is targeted to be printed;
    scaling the print data based on a region of interest from the one or more regions of interest, such that the scaled print data is properly formatted for the media size for the print job; and
    sending the print job to a printer, wherein the print job is executed using the printer.

2. The computer-implemented method of claim 1, further comprising:
    rotating the print data based on the region of interest and the media size.

3. The computer-implemented method of claim 2, wherein the print data is scaled and rotated to fit the region of interest to the media size.

4. The computer-implemented method of claim 1, wherein the one or more regions of interest comprise at least one of:
    an art box;
    a crop box; and
    a media box.

5. The computer-implemented method of claim 4, wherein the print data is scaled based on an order of precedence associated with the one or more regions of interest.

6. The computer-implemented method of claim 5, wherein scaling the print data based on the region of interest and the media size involves:
    attempting to scale the print data using the art box;
    if the art box is not specified, attempting to scale the print data using the crop box; and
    if the crop box is not specified, scaling the print data using the media box.

7. The computer-implemented method of claim 1, wherein the region of interest is obtained from metadata associated with the print data.

8. A system for performing a print job, comprising:
    an analysis apparatus configured to:
        obtain one or more regions of interest associated with print data for a print job, wherein each of the one or more regions of interest comprises a bounding box that identifies content within the print data, wherein the print data is not properly formatted for a media size for the print job, and wherein the media size refers to a physical size of a media onto which the print data is targeted to be printed; and
        scale the print data based on a region of interest from the one or more regions of interest, such that the scaled print data is properly formatted for the media size for the print job; and
    a print-management apparatus configured to send the print job to a printer, wherein the print job is executed using the printer.

9. The system of claim 8, wherein the analysis apparatus is further configured to:
    rotate the print data based on the region of interest and the media size.

10. The system of claim 9, wherein the print data is further scaled and rotated to fit the region of interest to the media size.

11. The system of claim 8, wherein the one or more regions of interest comprise at least one of:
    an art box;
    a crop box; and
    a media box.

12. The system of claim 11, wherein the print data is scaled based on an order of precedence associated with the one or more regions of interest.

13. The system of claim 12, wherein scaling the print data based on the region of interest and the media size involves:
    scaling the print data using the art box when the art box is specified;
    scaling the print data using the crop box when the art box is not specified; and
    scaling the print data using the media box when the art box and the crop box are not specified.

14. The system of claim 8, wherein the region of interest is obtained from metadata associated with the print data.

15. A non-transitory computer-readable storage medium storing instructions that when executed by a computer cause the computer to perform a method for performing a print job, the method comprising:
    obtaining one or more regions of interest associated with print data for the print job, wherein each of the one or more regions of interest comprises a bounding box that identifies content within the print data, wherein the print data is not properly formatted for a media size for the print job, and wherein the media size refers to a physical size of a media onto which the print data is targeted to be printed;
    scaling the print data based on a region of interest from the one or more regions of interest, such that the scaled print data is properly formatted for the media size for the print job; and
    sending the print job to a printer, wherein the print job is executed using the printer.

16. The computer-readable storage medium of claim 15, the method further comprising:
    rotating the print data based on the region of interest and the media size.

17. The computer-readable storage medium of claim 16, wherein the print data is further scaled and rotated to fit the region of interest to the media size.

18. The computer-readable storage medium of claim 15, wherein the one or more regions of interest comprise at least one of:

an art box;
a crop box; and
a media box.

19. The computer-readable storage medium of claim 17, wherein the print data is scaled based on an order of precedence associated with the one or more regions of interest.

20. The computer-readable storage medium of claim 19, wherein scaling the print data based on the region of interest and the media size involves:
- scaling the print data using the art box when the art box is specified;
- scaling the print data using the crop box when the art box is not specified; and
- scaling the print data using the media box when the art box and the crop box are not specified.

21. The computer-readable storage medium of claim 15, wherein the region of interest is obtained from metadata associated with the print data.

\* \* \* \* \*